(12) United States Patent
Stouffer

(10) Patent No.: US 7,142,097 B2
(45) Date of Patent: Nov. 28, 2006

(54) ENHANCED AUDIO FEEDBACK FOR VEHICLE SECURITY SYSTEMS

(75) Inventor: Peter J. Stouffer, Holly, MI (US)

(73) Assignee: Code-Systems, Inc., Troy, MI (US)

( * ) Notice: Subject to any disclaimer, the term of this patent is extended or adjusted under 35 U.S.C. 154(b) by 289 days.

(21) Appl. No.: 10/337,712

(22) Filed: Jan. 7, 2003

(65) Prior Publication Data
US 2004/0130439 A1 Jul. 8, 2004

(51) Int. Cl.
B60R 25/10 (2006.01)
(52) U.S. Cl. .............. 340/426.1; 340/426.15; 340/384.1; 340/384.4; 340/691.3; 340/691.5; 340/692
(58) Field of Classification Search ............ 340/426.1, 340/426.15, 384.1, 384.4, 384.6, 384.71, 340/384.72, 691.5, 691.3, 692
See application file for complete search history.

(56) References Cited

U.S. PATENT DOCUMENTS

| 5,079,538 | A | * | 1/1992 | DeFino et al. ......... 340/426.17 |
| 5,247,564 | A | * | 9/1993 | Zicker .................... 379/40 |
| 5,499,316 | A | * | 3/1996 | Sudoh et al. ............... 704/270 |
| 5,850,174 | A | * | 12/1998 | DiCroce et al. ....... 340/426.28 |
| 5,859,628 | A | * | 1/1999 | Ross et al. .................. 345/173 |
| 6,130,605 | A | * | 10/2000 | Flick .................... 340/426.23 |
| 6,452,483 | B1 | * | 9/2002 | Chen et al. ............. 340/425.5 |
| 6,480,098 | B1 | * | 11/2002 | Flick ......................... 340/7.2 |
| 6,873,824 | B1 | * | 3/2005 | Flick .......................... 455/41.2 |

* cited by examiner

Primary Examiner—Tai Nguyen
(74) Attorney, Agent, or Firm—F. Chau & Associates, LLC

(57) ABSTRACT

A vehicle security system comprises a security module adapted to detect an event, a memory for storing a composition, and a processor coupled to the security module, wherein upon detecting the event the processor selects the composition from the memory and triggers a modulated signal representing the composition, wherein the modulated signal is received by a speaker.

13 Claims, 6 Drawing Sheets

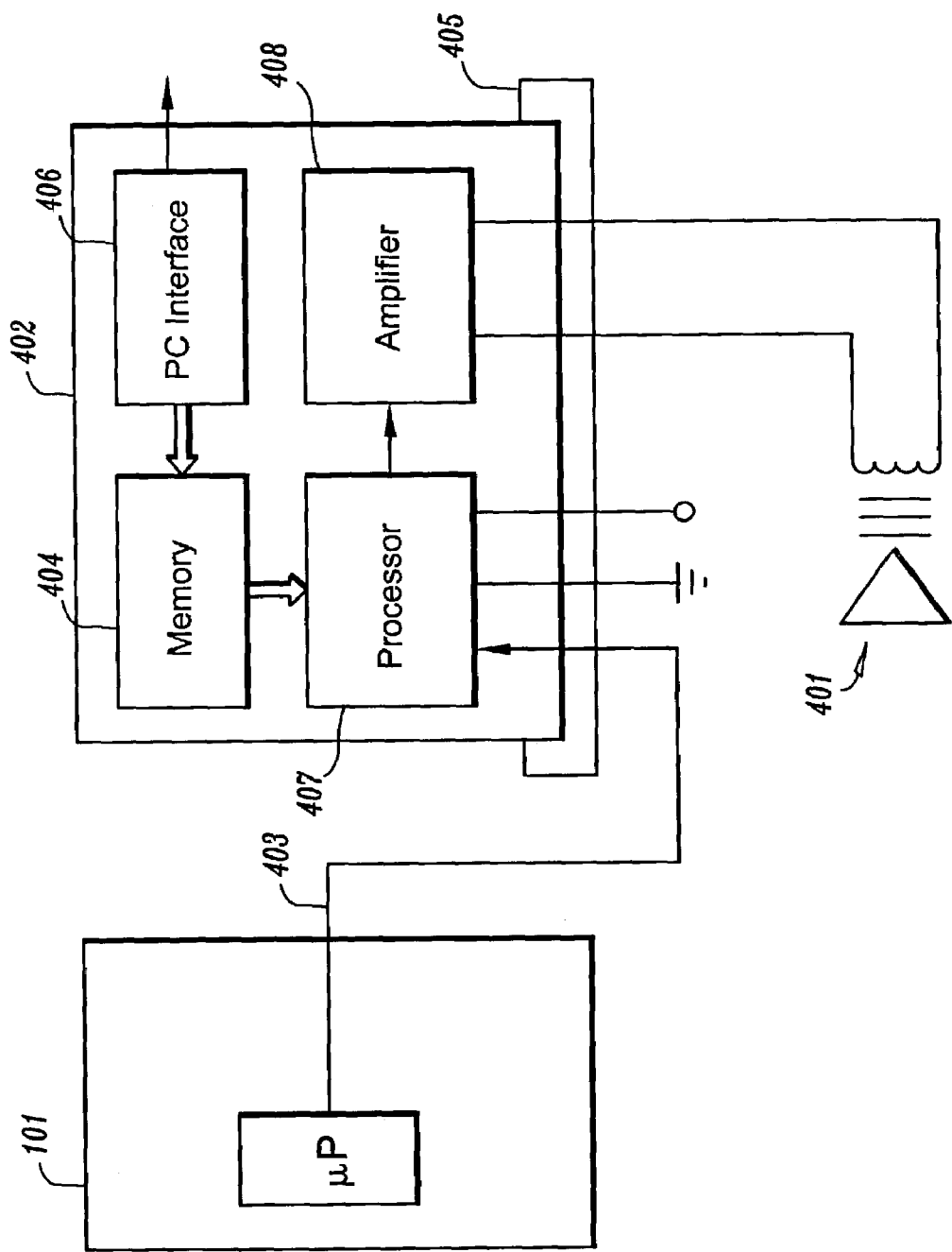

ENHANCED AUDIO FEEDBACK FOR VEHICLE SECURITY SYSTEMS

BACKGROUND OF THE INVENTION

1. Field of the Invention

The present invention relates to vehicle security systems, and more particularly to audio indications issued by a vehicle security system.

2. Discussion of Related Art

Vehicle security systems use a siren or horn to provide feedback to a user. Typically, the siren or horn of a vehicle security system emits a short "chirp" to indicate that it has received a signal from a remote control and is armed, disarmed, etc.

The vehicle security system comprises a security module 101 comprising a siren output 102. The siren output 102 has two states, on and off. The siren output 102 is received by a tone generator 103 within a siren module 104. The tone generator is coupled to a speaker 105 for emitting the chirp. Because the siren output 102 is limited to on and off, the aural capabilities of the vehicle security system are limited.

Therefore, a need exists for a modulated siren output.

SUMMARY OF THE INVENTION

According to an embodiment of the present invention, a vehicle security system comprises a security module adapted to detect an event, a memory for storing a composition, and a processor coupled to the security module, wherein upon detecting the event the processor selects the composition from the memory and triggers a modulated signal representing the composition, wherein the modulated signal is received by a speaker.

The vehicle security system further comprising an amplifier coupled between the processor and the speaker.

The vehicle security system comprises an interface coupled to the memory for receiving a composition from a device and storing the composition in the memory. The vehicle security system further comprises a cradle for supporting a sound module comprising the memory, the processor, and the interface, wherein the sound module is adapted to connect to and discount from the cradle.

The memory stores the composition and a table of contents.

The processor decodes the composition.

According to an embodiment of the present invention, a method of generating an aural vehicle security system indication comprises receiving a request from a security module, determining, in a table of contents, a composition corresponding to the request, and generating an aural sound corresponding to the composition.

The table of contents comprises a list of compositions and a list of events.

The method further comprises decoding the composition prior to generating the aural sound.

According to an embodiment of the present invention, a vehicle security system comprises a security module adapted to detect an event and generate a request, an interface coupled to the security module, and a sound module coupled to the interface, wherein the sound module is removable from the interface.

The interface is coupled to a speaker.

The sound module comprises a memory for storing a composition.

The sound module comprises a processor for receiving the request and selecting a composition from a memory corresponding to the request.

The vehicle security system further comprises an amplifier coupled between the processor and a speaker.

The vehicle security system comprises an external interface coupled to a memory for receiving a composition from a device and storing the composition in the memory.

BRIEF DESCRIPTION OF THE DRAWINGS

Preferred embodiments of the present invention will be described below in more detail, with reference to the accompanying drawings:

FIG. 4 is a diagram of a vehicle security system according to an embodiment of the present invention;

DETAILED DESCRIPTION OF PREFERRED EMBODIMENTS

According to an embodiment of the present invention, a vehicle security system comprises a memory storing a user selected aural composition. The different compositions can be uploaded to the memory. Different compositions can be played over a sound system corresponding to different security system events. The compositions can be implemented as a personalization of the vehicle security system and/or as a security feature.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
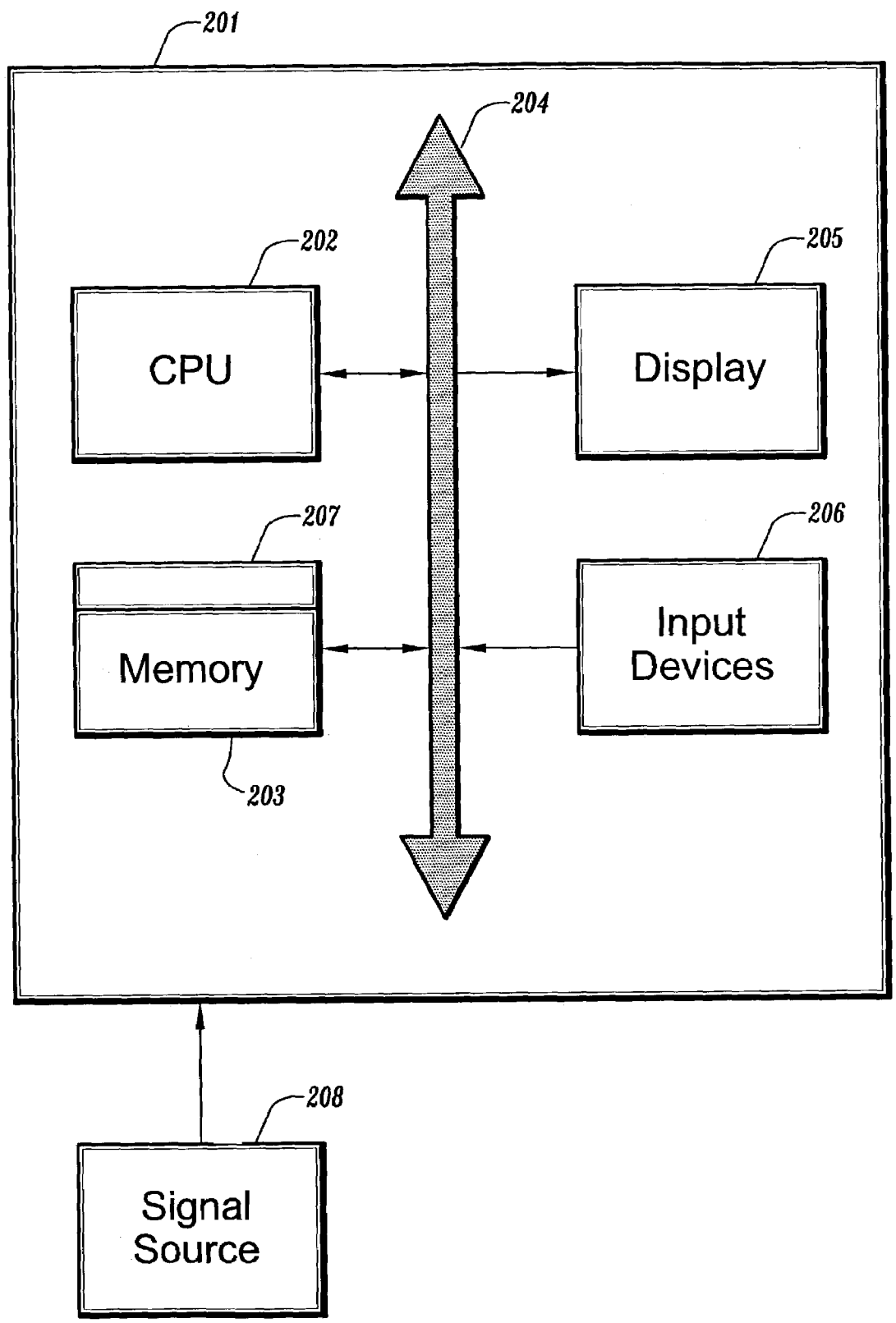
FIG. 2 is a diagram of a system according to an embodiment of the present invention.

Referring to FIG. 2, according to an embodiment of the present invention, a computer system 201 for implementing the present invention can comprise, inter alia, a central processing unit (CPU) 202, a memory 203 and an input/output (I/O) interface 204. The computer system 101 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general-purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
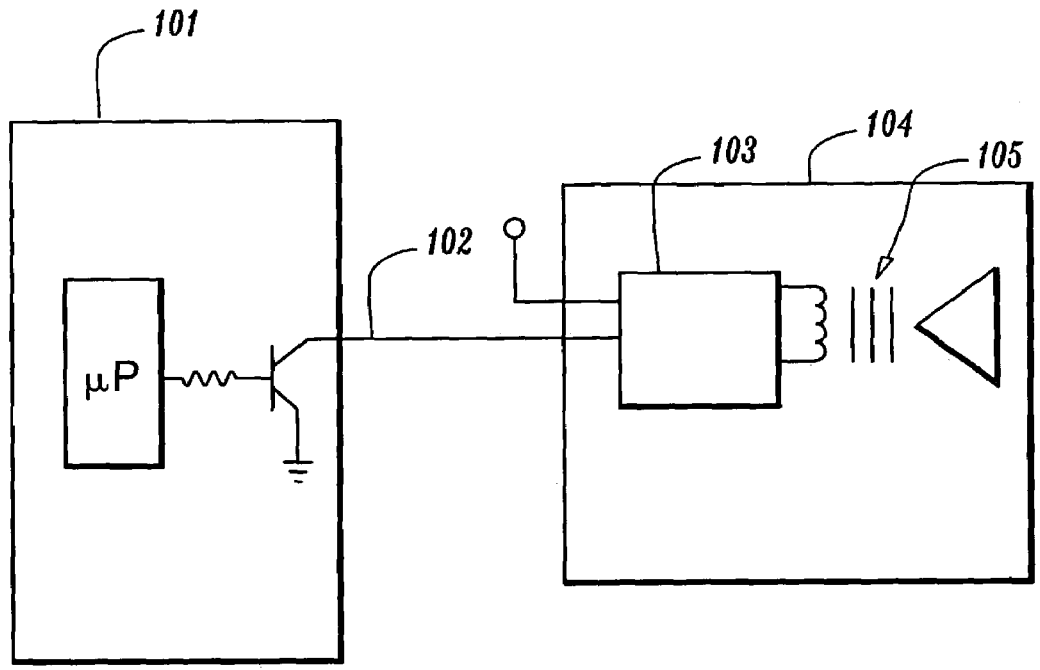
FIG. 1 is a diagram of a vehicle security system.
Figure 3A:
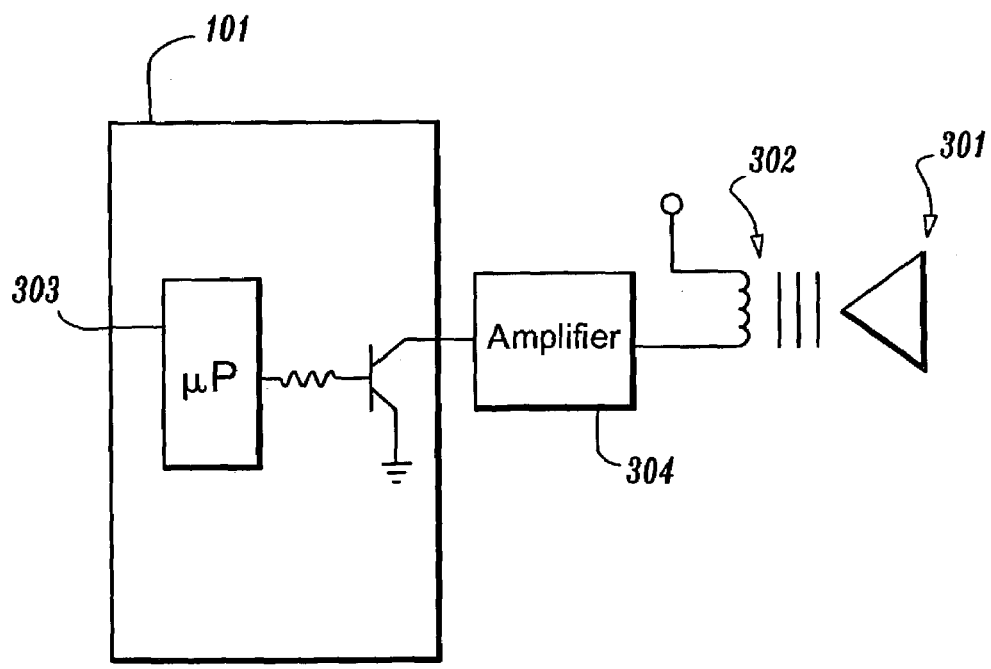
FIG. 3A is a diagram of a vehicle security system according to an embodiment of the present invention.

According to an embodiment of the present invention, an existing vehicle security system (e.g., a security module 101) can be augmented with a speaker 301 and onboard transistor driver 302 for driving the speaker, as shown in FIG. 3A. A square-wave based sound can be generated. One or more sound files can be resident in the security system's microcontroller 303. The microcontroller can be preloaded with one or more compositions that can be selected by a user. A user interface allows the selection of a song for each type of security system event. An amplifier 304 can be added between the security module 101 and the speaker 301 to increase a volume level.

Figure 3B:
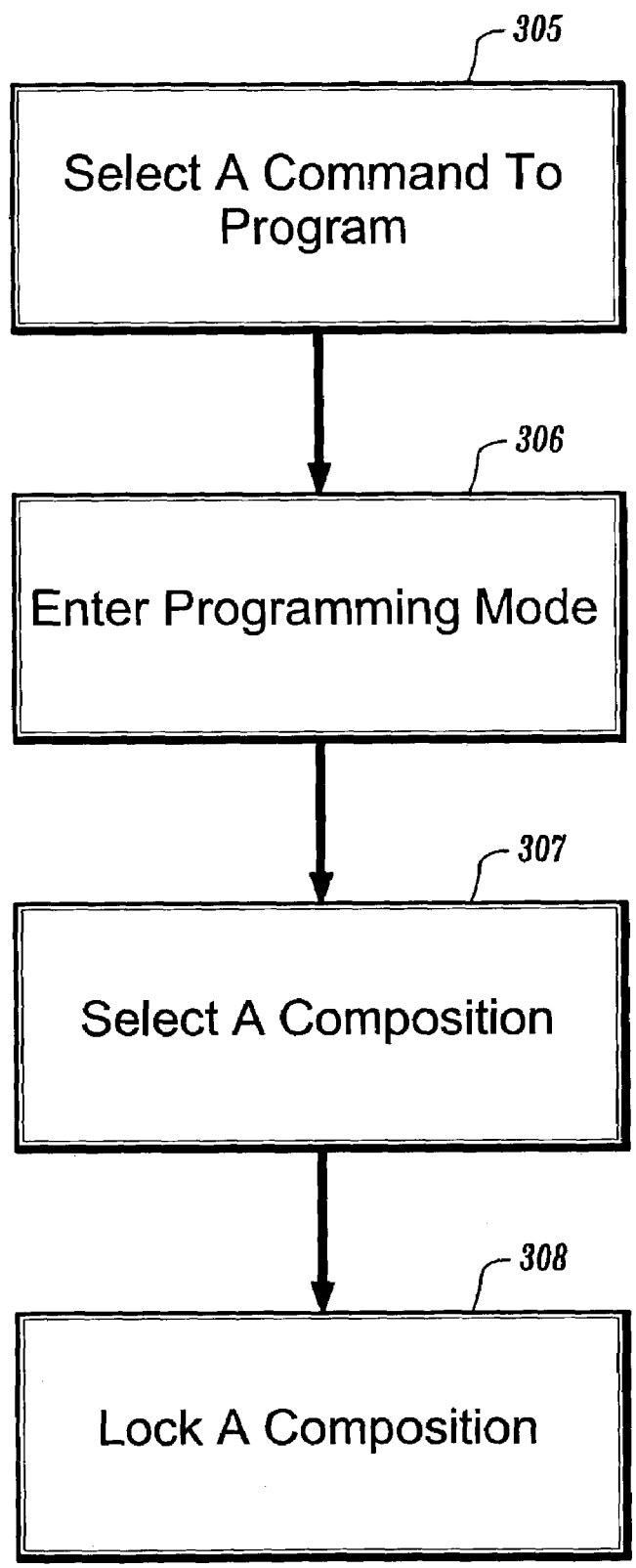
FIG. 3B is a flow chart of a method according to an embodiment of the present invention.

Referring to the user interface and FIG. 3B, preferably, a user issues a command using a remote control unit 305, wherein the security system comprises a receiver. The security system plays a composition corresponding to the command, for example, a security system arm command is accompanied by composition 1. The user can select a button or combination of buttons from the remote control unit to put the security system in a programming mode 306. While in the programming mode a user can scroll through each of the preloaded compositions using a subsequent button selection, playing a next composition in the preloaded set of compositions for each selection of the button or combination of buttons 307. A subsequent selection of a button or combination of buttons, for example, holding a predetermined button for five (5) seconds, locks the last composition played as corresponding to the command 308. One of ordinary skill in the art would appreciate that other means exist for controlling a vehicle security system, such as a valet switch mounted in a vehicle or the remote control unit and the valet switch in combination, and that these means can be used for controlling the selection of compositions.

Referring to FIG. 4, according to an embodiment of the present invention, a siren can be replaced with a speaker 401 and a sound module 402 can be placed between the security module 101 and the speaker 401. The security system 101 can generate a sound request on a data line 403. The sound module 402 receives the request and plays an appropriate composition from a memory 404. The composition can be amplified by an amplifier 408 and played through the speaker 401.

The sound module 402 is mounted in a cradle 405. The cradle 405 is a chassis for supporting the sound module 402 such that the sound module can be installed and removed from a vehicle. The cradle 405 is an interface coupling the system module 101 to the sound module 402. The cradle 405 comprises a wiring harness for connecting the data line 403 to the processor, for supplying power to the sound module 402 and for coupling the sound module 402 to the speaker 401.

The sound module 402 can be coupled to an external processor such as a personal computer or an MP3 player. The external processor interfaces with the sound module 402 through the interface 406, such as a serial port, Universal Serial Bus (USB) interface or IEEE 1394, High Performance Serial Bus. The interface 406 enables the storage of compositions (e.g., MP3 files) in the memory 404. Preferably the memory is one of electrically erasable programmable read-only memory (EEPROM) or flash memory. A processor 407 can be provided to decode compositions of various formats, e.g., MP3, Ogg Vorbis, or WAV files. The amplifier 408 can be provided to control the volume of the sound generated by the speaker 401.

It should be noted that a composition can be any aural sound, including, but not limited to songs from popular culture, a bird call, the Westminster Chime, etc. Thus, a high quality sound of a user's choosing can be produced.

Variations can exist in how the song is generated, where the song is stored, how songs are selected for each event, if and how new songs can be loaded into the system, how the sound/song is amplified, and what type of speakers are used. Additionally, physical variations may exist that place some or all of the elements into one or more housings. For example, the security module and sound module can be combined into one module.

The user interface comprises a means for setting a current state, such as a button, and a means for indicating the current state of the vehicle security system. For example, an LED light or siren that produces a chirp. The states of the vehicle security system can include armed, disarmed, valet, etc. In addition, the user interface can indicate a composition corresponding to a given vehicle security event. Events can comprise a breach of a vehicle entrance, such as a door, a trigger, for example, arming the vehicle security system, or a demo event for playing a selected composition.

The user interface is preferably an application run on a personal computer supporting a graphical user interface (GUI). The user interface allows a user to list files or compositions, upload files to the memory 404, download stored files, delete files from memory 404, and upgrade firmware. The files can be copied, reordered, deleted, etc. from the list, for example, by drag and drop. The user interface also displays appropriate security system events, such that compositions can be related to the events.

Figure 5:
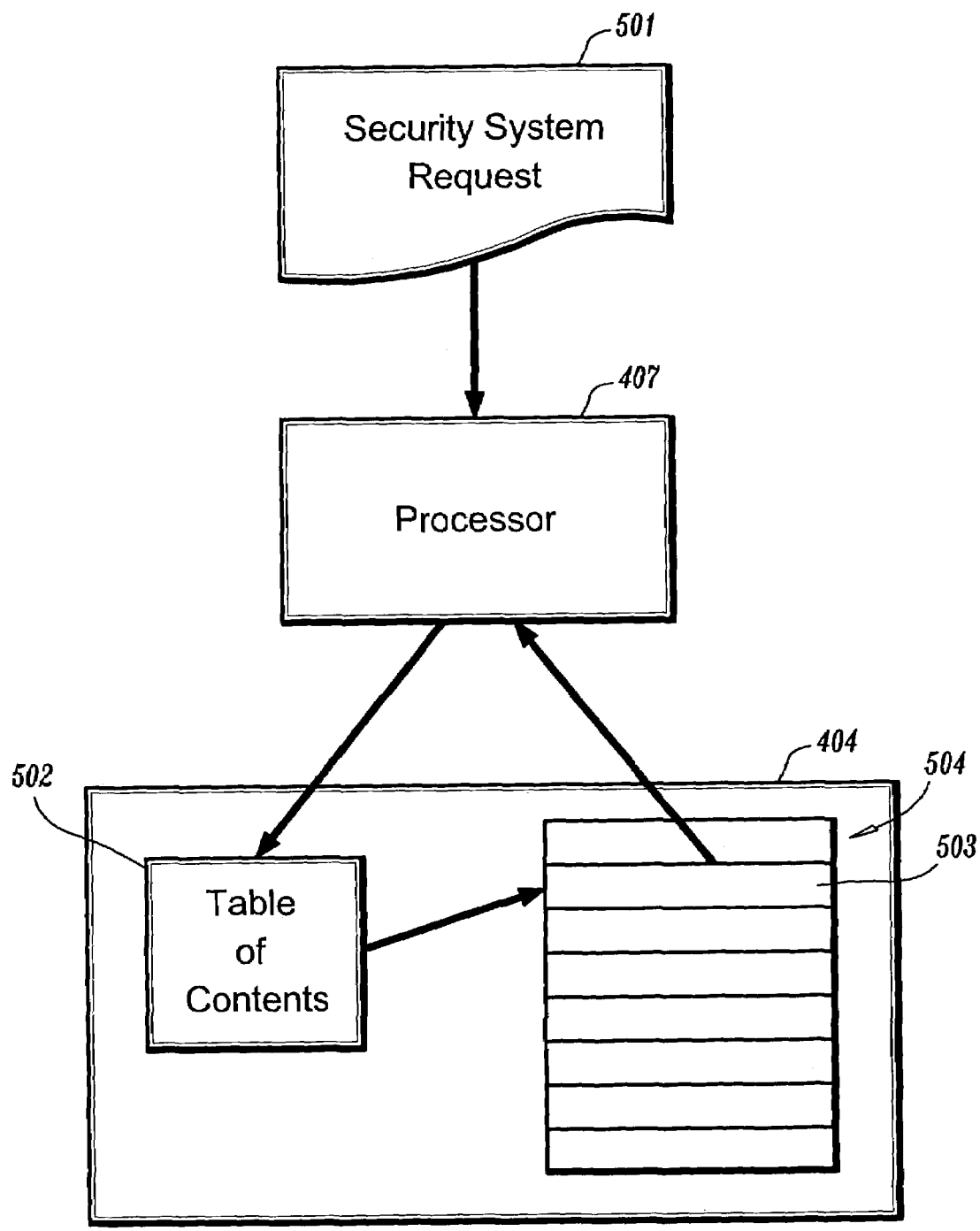
FIG. 5 is an diagram of a system according to an embodiment of the present invention.

Referring to FIG. 5, each event can have one or more corresponding compositions. Events and compositions can be related by flags in a table of contents (TOC) for a list of files, wherein a flag indicates a corresponding event. Therefore, given a request 501 from the security system 101, the processor 407 can determine from a table of contents 502 and appropriate composition 503 from a playlist 504. The composition 503 is retrieved from memory based on a user-defined flag relating to the given request and decoded by the processor 407.

According to another embodiment of the present invention, the order of compositions in a playlist defines which composition corresponds to which event. For example, a first composition in a playlist of three compositions corresponds to an arm event, a second composition corresponds to a disarm event, and a third composition corresponds to a panic event. Thus, a simplified user interface can include only those commands needed for ordering a playlist of compositions, for example, a copy command.

Figure 6:
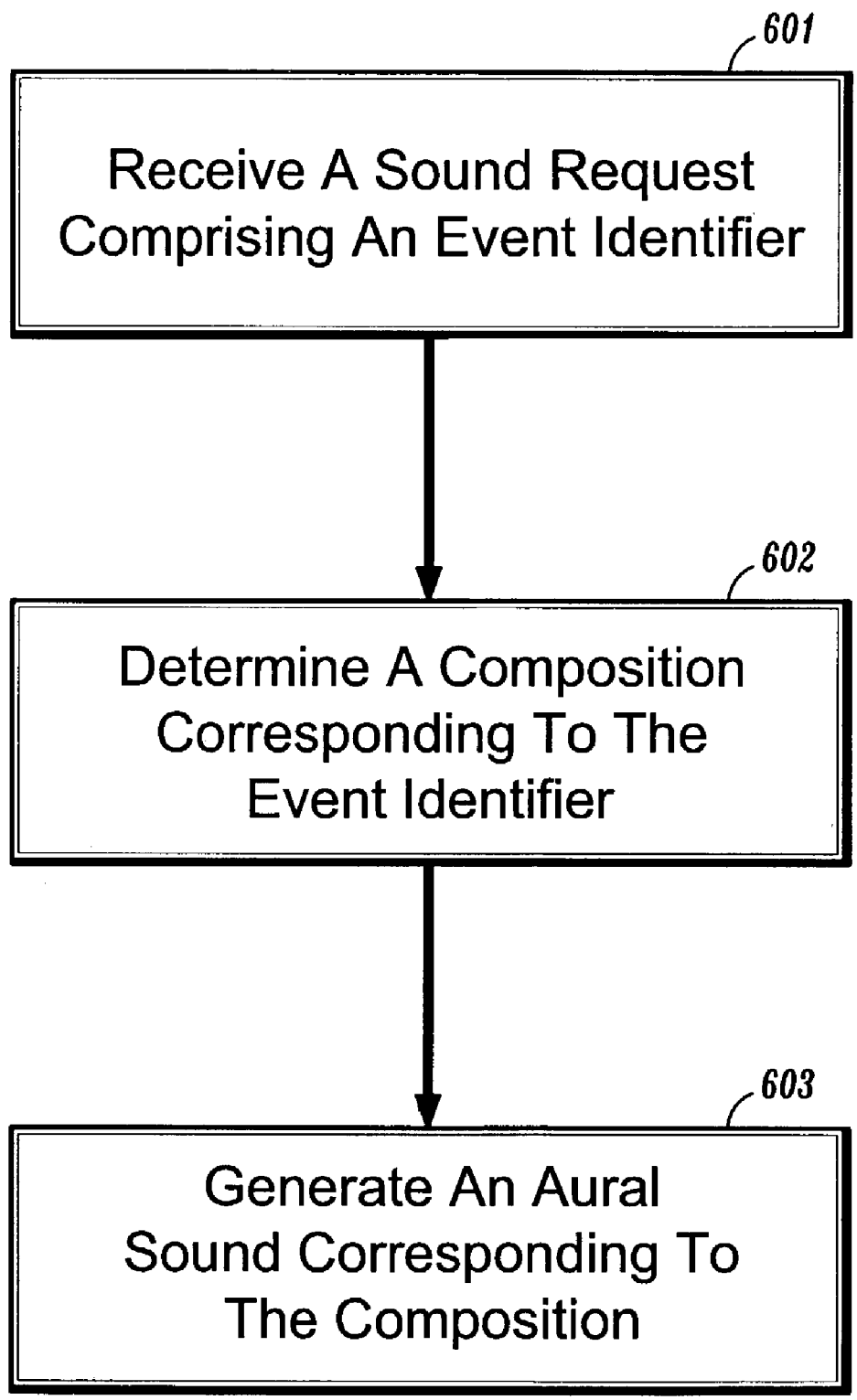
FIG. 6 is a flow chart of a method according to an embodiment of the present invention.

Referring to FIG. 6, a method for generating an aural vehicle security system indication comprises receiving a sound request from a security module 601, wherein the request comprises an event identifier. A composition corresponding to the event identifier is determined from a table containing a plurality of compositions 602. A sound corresponding to the composition is generated 603.

Having described embodiments for audio indications issued by a vehicle security system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A vehicle security system comprising:
   a security module adapted to detect an event;
   a memory for storing a plurality of compositions associated with a plurality of events; and
   a processor coupled to the security module, wherein upon detecting the event the processor selects a composition associated with the event from the plurality of compositions in the memory and triggers a modulated signal representing the composition, wherein the modulated signal is received by a speaker,
   wherein the plurality of compositions are associated with the plurality of events by selection from a remote control device.

2. The vehicle security system of claim 1, further comprising an amplifier coupled between the processor and the speaker.

3. The vehicle security system of claim 1, further comprising an interface coupled to the memory for receiving a composition from a device and storing the composition in the memory.

4. The vehicle security system of claim 3, further comprising a cradle for supporting a sound module comprising the memory, the processor, and the interface, wherein the sound module is adapted to connect to and disconnect from the cradle.

5. The vehicle security system of claim 1, wherein the memory stores a table of contents in which the plurality of compositions and the plurality of events are listed.

6. The vehicle security system of claim 1, wherein the processor decodes the selected composition.

7. The vehicle security system of claim 1, wherein the plurality of compositions includes one of a song, bird call and Westminster Chime.

8. The vehicle security system of claim 1, wherein the event is one of arming or disarming of the security system.

9. A vehicle security system comprising:
   a security module adapted to detect an event;
   a memory for storing a plurality of audio compositions associated with a plurality of events; and
   a processor coupled to the security module, wherein upon detecting the event the processor selects an audio composition associated with the event and causes the selected audio composition to play over a speakers,
   wherein association of the plurality of audio compositions with the plurality of events is by selection from a remote control device.

10. The vehicle security system of claim 9, wherein the selected audio composition is one of a song or a bird call.

11. The vehicle security system of claim 9, wherein the event is one of arming or disarming of the security system.

12. The vehicle security system of claim 9, wherein activation of the event is by remote control.

13. A vehicle security system comprising:
   a security module adapted to detect an event;
   a memory for storing a plurality of compositions associated with a plurality of events;
   a processor coupled to the security module, wherein upon detecting the event the processor selects a composition associated with the event from the plurality of compositions in the memory and triggers a modulated signal representing the composition, wherein the modulated signal is received by a speaker;
   an interface coupled to the memory for receiving a composition from a device and storing the composition in the memory; and
   a cradle for supporting a sound module comprising the memory, the processor, and the interface, wherein the sound module is adapted to connect to and disconnect from the cradle.

* * * * *